July 31, 1962  A. E. JOHNSON  3,047,848
SAFETY CIRCUIT FOR RECTIFIER POWER SOURCES
Filed March 25, 1957  2 Sheets-Sheet 1

INVENTOR.
ARTHUR E. JOHNSON
BY *Andrus + Sceales*
ATTORNEYS

July 31, 1962 A. E. JOHNSON 3,047,848
SAFETY CIRCUIT FOR RECTIFIER POWER SOURCES
Filed March 25, 1957 2 Sheets-Sheet 2
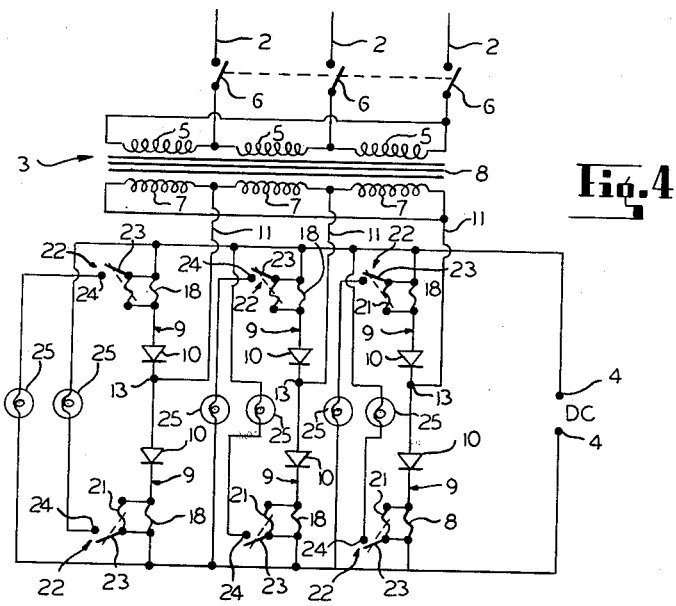
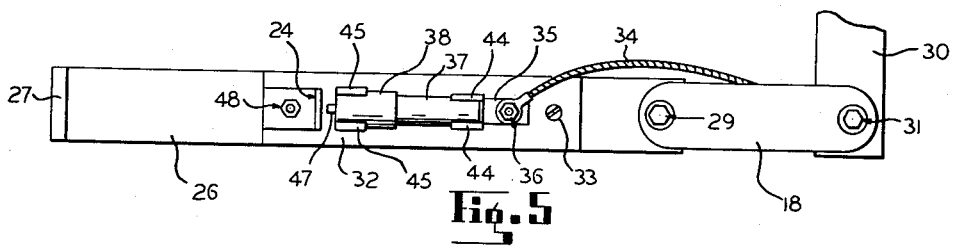
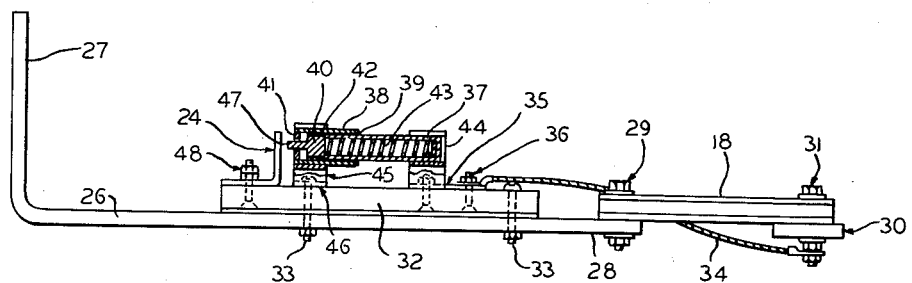
INVENTOR.
ARTHUR E. JOHNSON
BY Andrus & Scealis
ATTORNEYS United States Patent Office 3,047,848
Patented July 31, 1962

3,047,848
SAFETY CIRCUIT FOR RECTIFIER
POWER SOURCES
Arthur E. Johnson, Elkhorn, Wis., assignor to A. O. Smith
Corporation, Milwaukee, Wis., a corporation of New
York
Filed Mar. 25, 1957, Ser. No. 648,329
5 Claims. (Cl. 340—250)

This invention relates to a safety circuit for rectifier power sources and particularly to a rectifier source including a plurality of parallel connected rectifier units.

A principal requirement in rectifier power sources particularly in higher amperage units is the maintenance of service continuity to the load. In the rectifier power source employing parallel connected rectifier units, a protective system is normally employed wherein failure of any of the rectifier surfaces causes a complete disconnection of the power circuit from the alternating current input. This results, of course, in a total loss of power to the load.

In accordance with the present invention, each branch of the rectifier circuit is provided with a current conditioned element which disconnects only that particular branch from the power supply in the event the rectifier therein fails. A signal or indicating device is also connected in a triggering circuit with a separate branch circuit for each of the current conditioned elements. If a rectifier fails, the triggering circuit energizes the indicating device to identify the failure. However, the load current is presently maintained by the other rectifier branches. The defective rectifier may then be repaired or replaced at some later time when service can conveniently be discontinued.

The present invention provides a reliable protective system for indicating and identifying the failure of a rectifier in rectifier assemblies without complete loss of output. The indicating means may be placed at some remote central station from which a plurality of different power supplies are controlled and checked.

The drawings furnished herewith illustrate the best modes presently contemplated for carrying out the invention.

In the drawings:

FIG. 4 is a schematic circuit diagram similar to FIG. 1, of another embodiment of the invention;

FIG. 5 is a plan view of a fuse trigger switch; and

FIG. 6 is an elevational view of the fuse trigger switch with parts broken away and sectioned.

Figure 1:
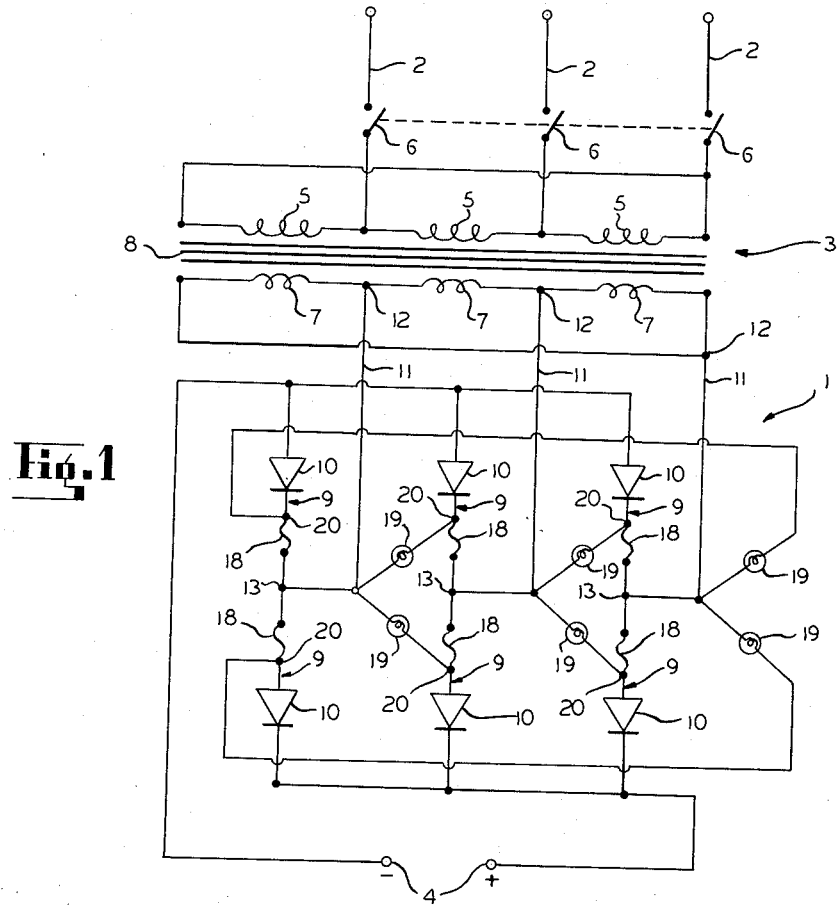
FIG. 1 is a schematic diagram of one embodiment of the invention employing a full wave rectifier circuit having a three-phase alternating current input.

Referring to the drawings and particularly to FIG. 1, a bank of rectifiers 1 are connected in full wave rectifying circuit to a set of three-phase alternating current lines 2 through a suitable voltage regulating transformer 3. A set of load terminals 4 are connected to the rectifiers 1 to power a direct current load, not shown.

The transformer 3 changes the incoming voltage to suitable rated input voltage for the bank of rectifiers 1. The illustrated transformer 3 comprises three primary phase windings 5 which are connected in a delta circuit to the input lines 2. Simultaneously actuated control switches 6 are connected one in each of the three lines 2 to permit making and breaking of the power connection either manually or automatically through suitable actuators, not shown. Three secondary windings 7 are also connected in a delta circuit and each secondary winding is magnetically coupled to one of the primary windings 5 by a magnetic core 8. The output of the secondary windings is connected to the input to the bank of rectifiers 1.

The bank of rectifiers 1 includes six individual branches 9 which are connected by series-connected pairs in three parallel paths across the direct current terminals 4. A separate rectifier unit 10 which permits appreciable current flow in only one direction is connected in each of the branches 9. Each rectifier unit 10 is connected with the same polarity with respect to the direct current terminals 4, that is only allowing current flow to the positive D.C. terminals 4 and from the negative D.C. terminal 4.

Three alternating current leads 11 are connected to the respective three junctions 12 of the delta connected secondary windings 7 and to the central junctions 13 of the branch circuits 9 in the three parallel rectifying paths. The alternating current in each of the leads 11 flows to and from the load, not shown, through the lower and upper rectifying units 10 in the three parallel paths during the positive and negative portions of each current cycle, respectively.

Figures 2, 3:
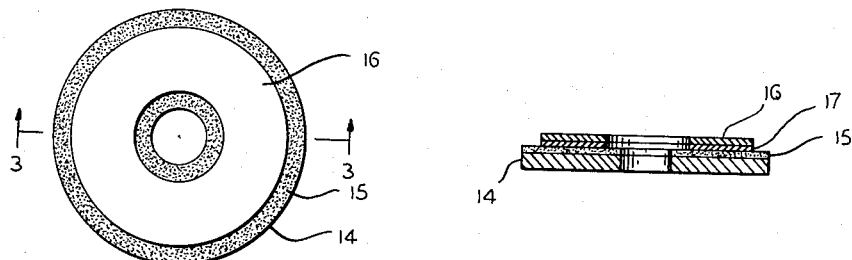
FIG. 2 is a plan view of an illustrative dry plate rectifier element employed in direct current power circuits.
FIG. 3 is a cross-sectional view taken on line 3—3 of FIG. 2.

Each rectifier unit 10 is preferably a dry plate rectifier type employing a plurality of stacked rectifying elements such as is generally illustrated in FIGS. 2 and 3. Each element comprises a base plate 14 which is covered by a coating 15 of suitably treated selenium or other similar semi-conducting material. A metallic counter-electrode 16 is then applied, to the coating 15 most commonly by spraying. The counter-electrode 16 is disposed in spaced relation to the edges of the plate 14 to prevent short circuiting from the counter electrode 16 to the base plate 14. When the counter-electrode 16 is applied to the semi-conductive coating 15, a minute barrier layer 17, shown greatly enlarged in FIG. 3 is formed. The barrier layer 17 establishes the rectifying action of the element between the base plate 14 and the counter-electrode 16. A plurality of the rectifying elements are connected in series to provide sufficient current capacity as each of the individual elements is generally quite limited. Further, the maximum reverse peak voltage, that is the voltage across the element is a non-conducting or reverse direction, that can be applied to an individual element without destroying the barrier layer 17 is quite low.

In the event the barrier layers 17 of a rectifying unit 10 are destroyed, the rectifying unit is shorted and passes both the positive and the negative portion of the alternating current. This places the corresponding rectifier units 10 in the other two parallel paths directly across one phase of the secondary windings 7, and unless the shorted rectifier branch 9 is opened, the other corresponding rectifier units are also destroyed. The present embodiment of the invention disconnects a shorted rectifier unit and provides a suitable indication of the disconnection without discontinuing service to the load as follows.

A protective fuse 18 is serially connected in each individual branch 9 with the associated rectifier unit 10 and serves as a current conditioned device. In the event of discontinuity of rectifying action within any rectifier unit 10, the current increases as the shorted rectifier passes current during both the negative and the positive half cycle of current. The increase in current melts the fuse 18 and disconnects the associated branch 9 and defective rectifier unit 10 from the circuit. For example, assume that the rectifier unit 10 in the upper right hand circuit branch 9 breaks down and allows current flow in either direction, the current path from the right hand input lead 11 is directly to the corresponding rectifier units 10 in the upper branches 9 of the adjacent parallel current paths, through each of the rectifiers units 10 and the fuse elements 18 connected in series therewith to the respective left hand input lead 11 and the central input lead 11.

The current surge immediately melts the fuse element 18 in series with the upper right hand unit 10 and thereby breaks the above circuit. The momentary current surge does not destroy the other rectifier units 10. Nor, does the current surge melt the fuse elements 18 in series with the latter rectifier units 10 as the current in each path is less than the total current through the fuse element which melts. As the blown fuse 18 is in the individual branch, the other branches 9 of the circuit continue to furnish current to the load, not shown, connected to terminals 4.

To provide a visual indication and identification of a defective rectifier unit, a separate indicating lamp 19 is serially connected with each fuse 18 across one of the secondary phase windings 7. One end of each lamp 19 is connected to a terminal 20 between the rectifier unit 10 and the associated fuse 18 and the opposite end is connected to one of the leads 11 other than the lead 11 connected to the rectifier unit to which the lamp 19 under consideration is connected. The lamps 19 are thus each connected in an alternating current circuit which is dependent on an associated fuse 18 and identifies the associated rectifier unit 10. For example, the lamps 19 shown to the right in FIG. 1 are connected in parallel directly across the phase winding 7 also shown to the right in FIG. 1, as follows: starting with lead 11 which is shown to the right in FIG. 1 and which is connected to one side of the winding 7, shown to the right in FIG. 1, dividing through the fuses 18 in the upper and lower branches 9 of the right hand parallel path, and then through the lamps 19 connected to the respective fuses 18 by terminals 20 and then back to the lead 11 which is shown centrally of FIG. 1 and which is connected to the opposite side of the subject phase winding 7. The other lamps 19 are similarly parallel connected in pairs across the other two phase windings 7.

The lamps 19 are relatively high impedance devices and therefore the current flowing in the alternating current circuit is insufficient to melt the serially connected fuse element 18. However, in the event a rectifier unit 10 is defective and an abnormal current flows through the rectifier, the associated fuse 18 melts and disconnects the rectifier unit 10 from the circuit as previously described. This breaks the A.C. circuit of the associated lamp 19. The failure of a lamp 19 indicates and identifies the failure of the rectifier unit 10 which is then replaced at a time when service may conveniently be interrupted. In the meantime, power is continuously supplied to the load and continuity of service is maintained.

When one of the A.C. circuits including a lamp 19 is broken, the lamp 19 is connected across the phase voltage in series with a still active rectifier unit 10 in another branch 9 and also across another phase winding in series with another active rectifier unit 10. This voltage is insufficient to operate the lamp with any degree of brilliance and a disconnected rectifier is readily identified. For example, assume the fuse 18 shown in the upper right hand branch 9 of FIG. 1 blows due to a short in the associated rectifier unit 10. The A.C. circuit for the associated lamp 19, shown as the upper central lamp, is consequently also broken. The upper central lamp 19 is now connected in circuit with the rectifier unit 10 in the upper left hand branch 9 of FIG. 1 as follows: starting with the central lead 11 which is connected to one side of the central phase winding 7, through the lamp 19 and the blown rectifier unit 10 to the upper left hand branch 9 and then through the rectifier unit 10 and fuse 18 to the left hand lead 11 of FIG. 1 which is connected to the opposite side of the central phase winding 7 of FIG. 1.

Therefore, when the central input lead 11 is positive with respect to the other two leads 11, current flows through the central lamp 19 in the circuit as just described. This applies phase voltage less the small voltage drop through the rectifier to the lamp 19. However, when the central input lead is negative with respect to the other leads 11, the rectifier unit 10 in the above circuit prevents current flow therethrough. The lamp 19 is now connected in a parallel circuit with the left hand rectifier unit 10 and the central rectifier unit 10. Therefore, the voltage drop across these active paralleled rectifier units 10 is impressed on the lamp. The voltage drop through a rectifier unit 10 is of course necessarily low, in fact so low that the lamp for all practical purposes is extinguished.

Although the lamp 19 associated with a defective rectifier is not completely extinguished, it is always somewhat diminished in brilliance and does go out for practical purposes.

Referring to FIGS. 4 and 6, a second embodiment of the invention is illustrated in connection with a three-phase full wave rectifier circuit, as shown in FIG. 1. Corresponding elements in FIGS. 1 and 4 are given the same number.

Referring particularly to FIG. 4, a rectifier stack signalling fuse 21 is connected in parallel with the main fuse 18. The connection of the fuses 18 and 21 is made on the side of the rectifiers connected to the direct current circuit. The one terminal of each fuse 18 and 21 is connected directly to a D.C. line and the other terminal of each is connected to the direct current terminal or pole of the rectifier stack 10. The signal fuse 21 is a relatively high resistance fuse and the current in the associated branch 9 normally flows through the main fuse 18 which in effect short circuits fuse 21. However, if the main fuse 18 blows for any reason, the current then attempts to flow through the signalling fuse 21 which then blows. The fuse 21 is mechanically coupled with a signal switch 22 to hold a movable contact member 23 in spaced relation to a stationary contact member 24. The movable contact member 23 is connected directly to the direct current line leading to the one terminal 4 to which the associated signalling fuse 21 is connected and the stationary contact member 24 is connected to the other direct current line or terminal 4 in series with a lamp 25 or other suitable indicating device. When switch 22 closes, the lamp 25 is energized to signify the disruption of the fuses.

Referring to FIGS. 5 and 6, a combination main fuse, signalling fuse and signal switch is shown. A direct current jumper 26 is secured at one end 27 to other similar jumper straps for the other parallel branches of the circuit to establish one of the output terminals 4. The opposite end 28 of jumper 26 is secured by a suitable bolt connection 29 to one terminal of the main fuse 18. The other terminal of the main fuse 18 is connected by a suitable connector 30 to the corresponding terminal of rectifier 10 by bolt 31. This establishes one of the series connected branches 9 in each of the parallel paths including a rectifier 10 as follows: rectifier 10, line connector 30, fuse link 18, jumper 26, and D.C. output terminal 4.

In the construction of FIGS. 5 and 6, the signalling fuse 21, is paralleled, as presently described. An insulating strip 32 is secured by a plurality of bolts 33 to one surface of the jumper 26. A small jumper wire 34 is connected to the connector 30 by the bolt 31 and the opposite end is connected to a terminal 35 of the auxiliary signalling fuse 21 by connector bolt 36. The signalling fuse includes a pair of telescoped tubular members 37 and 38 which are made of any suitable high-resistance conducting metal. Member 37 is clamped within member 38 with a suitable electrical insulation 39 disposed therebetween to prevent conduction directly from member 37 to member 38. The movable contact 23 of FIG. 4 is shown in FIGS. 5 and 6 as comprising in part a solid disk-shaped contact base 40 which is releasably secured to the inner wall of tube 38 in spaced relation to the front wall 41 of tube 38 by a fusible solder 42. The disk shaped base 40 is secured in engagement with the inner end of tube 37 to establish a current path from tube 37 to tube 38. A coil spring 43 is disposed within tube 37 between the base 40 and the end of tube 37. The spring 43 is compressed and is held in a compressed state by the solder 42 which prevents movement of the base 40. The tube 37 is secured or clamped between a pair of upstanding arms 44 extending from terminal 35. The free end of tube 38 is clamped between a pair of upstanding arms 45 of a terminal clip 46. One of the bolts 33 which secures the insulating strip 32 to jumper 26 also secures terminal clip 46 to the D.C. jumper 26 to complete a parallel fuse link across the main fuse 18 as follows: starting with the connector 30, jumper wire 34, terminal 35, tubular member 37, contact base 40, solder 42, tube member 38, terminal 46 and bolt 33 to the jumper 26.

The movable contact member 23, as shown in FIGS. 5 and 6, includes a contact button 47 extending integrally from the base 40 and through an opening in front wall 41 of tube 38. Contact button 47 is held in spaced relation from the stationary contact 24 which is shown in FIGS. 5 and 6 as an L-shaped strap connected by a small bolt 48 to the insulating strip 32. A D.C. lead, not shown in FIGS. 5 and 6 is also secured to contact 24 and connected to a lamp or other signalling device 25.

The operation of the embodiment shown in FIGS. 4–6 is described as follows:

Assume the rectifiers 10 are connected in an operating circuit and that the upper left hand rectifier stack 10 breaks down and permits current to flow in both directions. The main fuse 18 blows in the same manner as described with respect to FIG. 1. The defective rectifier stack 10 is still in circuit through the auxiliary fuse 21 which is no longer shorted from the circuit by the fuse 18. The current in fuse 21 immediately melts or disrupts solder 42 which releases the contact base 40 of contact 23. The spring 43 is also released and rapidly propels the contact base 40 in a forward direction and effects engagement of the button 47 of contact 23 and contact 24. When contact base 40 is released and disengages tubular member 37, the current path from member 37 to member 38 is broken and thus opens the previously described path for the signalling fuse 21. When switch 22 closes as a result of the engagement of contacts 23 and 24, the associated lamp 25 is connected directly across the D.C. leads or terminals 4 and thus the lamp is energized.

Each branch of the rectifier circuit shown in FIG. 4, operates in a similar manner and indicates and identifies a particular rectifier stack 10.

Subsequently, when the edefective rectifier stack is repaired, replaced or the like, a new main fuse 18 is inserted. The auxiliary fuse 21 is also replaced or refused by removing the telescoped members 37 and 38 from between the terminal arms 44 and 45 respectively and replacing them with a new set to refuse the branch circuit.

To prevent loss of rectifier identification in the event the signalling or identifying lamp is defective, a direct current relay means may have contacts connected in a normally complete lamp circuit and be operated directly by the safety fuse to open the lamp circuit in response to defective rectifier operation.

Although the embodiments of the present invention are described with dry-plate type rectifiers, with current fuses and with indicating lamps, other suitable devices adapted to perform the same general function may be employed.

The alternating current safety circuit of FIGS. 1–3 may be connected to more than one phase of the polyphase source if desired or convenient within the scope of the present invention. Further, although indicating lamps 19 having an internally high impedance are illustrated, a low impedance indicator in series with a high impedance element may be employed.

The present invention provides a protective system for a direct current power source employing parallel connected rectifiers which permit continuity of service in the event of failure of a part of the rectifier circuit and positively indicates the circuit branch which fails.

Various modes of carrying out the invention are contemplated as being within the scope of the following claims particularly pointing out and distinctly claiming the subject matter which is regarded as the invention.

I claim:
1. A direct current power supply employing rectifying devices connected in parallel to an A.C. input, which comprises individual current-conditioned means serially connected one each with each of said rectifying devices, said means being responsive to abnormal operation of the associated rectifier device to disconnect the main A.C. input to the defective device, and a plurality of alternating current devices connected one each in series connection with each current-conditioned means to said A.C. input and responsive to the disconnection of the associated rectifier device to identify the rectifier device disconnected.

2. A direct current power supply circuit including a plurality of unidirectional devices connected in a bridge type rectifying circuit to a polyphase power input, which comprises individual fuse elements serially connected one with each of said unidirectional devices and responsive to a predetermined abnormal operation of the associated device to disconnect the associated device from the rectifying circuit, and a plurality of branch circuits each including an indicating means in series connection with one of said fuse elements, said branch circuits being connected with said polyphase current input and said indicating means being responsive to operation of a fuse element to indicate and to identify the disconnection of the associated device.

3. A direct current power supply adapted to be connected to a polyphase current source and to furnish a direct current output, which comprises a plurality of rectifying units each adapted to have one terminal connected to one terminal of a polyphase current source and the opposite terminal to the load to rectify various phases of the current source and combine the rectified current into a unidirectional output current, a plurality of fuse means connected one between each rectifying unit and the immediate input of the current source and responsive to abnormal operation of the immediately connected rectifying unit to disconnect the same from the circuit, and an alternating-current indicating circuit means including a high impedance and being serially connected at least one each with each of said fuse elements across at least one phase of said current source to provide alternating current safety circuits dependent on normal operation of said rectifying units, said high impedance preventing actuation of said fuse means under normal operation of the rectifying units.

4. In a direct current power supply adapted to be connected to the three input terminals of a three phase alternating current input and to establish a unidirectional current output, three parallel unidirectional paths having two or more serially connected unidirectional-current devices, said three input terminals being connected one to each of said parallel paths intermediate said unidirectional-current devices to establish a full wave rectified current output across said parallel paths, fuse elements serially connected one with each of the unidirectional-current devices on the side connected to an input terminal and responsive to abnormal operation of the associated devices to disconnect the associated devices from the adjacent terminal, and electrically operated indicating means connected one each to the respective junctions of said current devices and said fuse elements and to another input terminal other than the terminal connected to the adjacent connected fuse element to establish an alternating current operating circuit for said means serially including said means and said fuse elements, said means having a high impedance to prevent actuation of the fuse element under normal operation of the associated device.

5. A direct current supply adapted to be connected to a three phase alternating current input having three terminals with one phase between respective terminals, which comprises three parallel unidirectional paths each having a pair of dry-plate rectifiers in series connection to allow current flow in the same direction with respect to a load connected across said parallel paths, intermediate A.C. terminals between each pair of rectifiers adapted to be connected one to each of the phase terminals to establish a full wave rectifying circuit, fuse elements serially connected one each between said rectifying elements and the immediate phase terminal, and a plurality of electrically operated visual indicators having a high impedance, each of said indicators being connected at one end to the junction of a rectifier and a fuse element different than the other indicators and at the opposite end to a phase terminal other than the terminal connected to the associate connected fuse element to establish an alternating current circuit for each of said indicators.

References Cited in the file of this patent

UNITED STATES PATENTS

| | | |
|---|---|---|
| 2,057,531 | Livingston | Oct. 13, 1936 |
| 2,141,927 | Morack | Dec. 27, 1938 |
| 2,398,366 | Emley | Apr. 16, 1946 |
| 2,774,960 | Podell | Dec. 18, 1956 |
| 2,813,243 | Christian et al. | Nov. 12, 1957 |
| 2,932,781 | Jensen | Apr. 12, 1960 |